(12) United States Patent
Seo et al.

(10) Patent No.: US 6,640,260 B2
(45) Date of Patent: Oct. 28, 2003

(54) METHOD OF TRANSMITTING DATA STREAM INCLUDING MULTI-PATH SECTIONS

(75) Inventors: Kang-Soo Seo, Kyunggi-do (KR); Jea-Yong Yoo, Seoul (KR); Byung-Jin Kim, Kyunggi-do (KR); Hyung-Sun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 302 days.

(21) Appl. No.: 09/842,764

(22) Filed: Apr. 27, 2001

(65) Prior Publication Data

US 2002/0097981 A1 Jul. 25, 2002

(30) Foreign Application Priority Data

Apr. 27, 2000 (KR) ......................................... 2000-22579

(51) Int. Cl.[7] ............................... G06F 3/00; H04N 5/93
(52) U.S. Cl. ...................... 710/5; 710/5; 710/6; 710/7; 710/20; 710/21; 386/52; 386/55
(58) Field of Search ................................ 386/109, 111, 386/112, 46, 92, 96, 52, 55; 360/33.1, 13; 710/20, 21, 5, 6, 7

(56) References Cited

U.S. PATENT DOCUMENTS 5,819,003 A * 10/1998 Hirayama et al. ............ 386/46
5,848,216 A * 12/1998 Kaneshige .................... 386/52

* cited by examiner

Primary Examiner—Jeffrey Gaffin
Assistant Examiner—Joshua D Schneider
(74) Attorney, Agent, or Firm—Birch, Stewart, Kolasch & Birch, LLP

(57) ABSTRACT

The present invention relates to a method of transmitting data stream including multi-path data stream sections to a connected digital television. This data stream transmitting method checks the number of maximum multiple paths of data streams recorded in a recording medium when a reproduction is requested, copies an uni-path stream section read from the recording medium so that the number of total same stream sections is equal to a target number which is determined based on the maximum number, assigns each stream section to a virtual channel to form multi-channel streams, and transmits the multi-channel streams to an outer device through a digital interface. Through this data stream transmitting method, it is possible to transmit an angle- or story-based stream segment a viewer wants to view among multi-path stream so that the stream of the selected angle or story may be presented seamlessly at the borders between neighboring stream sections by very simple algorithm.

12 Claims, 6 Drawing Sheets

*Conventional Art*

*Conventional Art*

METHOD OF TRANSMITTING DATA STREAM INCLUDING MULTI-PATH SECTIONS

BACKGROUND OF THE INVENTION

1. Field of the Invention

The present invention relates to a method of transmitting data stream including multi-angle or multi-story stream sections recorded in a recording medium to a displaying apparatus connected through a digital interface such as IEEE 1394 standard.

2. Description of the Related Art

In these days, a digital television being able to present high-quality pictures is being spread rapidly and widely.

In the meantime, a high-density DVD player (referred as 'HDVD player') is also being developed. A HDVD player aims to reproduce data written in a high-density DVD (Digital Versatile Disk) whose recording standard is under discussion at present. For better presentation of data reproduced from a HDVD player, a HDVD player is likely to be connected to a digital television through a digital interface such as IEEE 1394 standard.

Data streams recorded in a high-density DVD may contain many multi-angle or multi-story stream sections since the storage capacity of a high-density DVD is very high. The multi-angle stream has different scenes viewed from different angles and the multi-story stream has different stories in its stream segments.

When multi-angle or multi-story stream is encountered in reproduction of a high-density DVD, a user can select desired viewing angle or story at that branching point. This operation is explained in detail with reference to the accompanying drawings. Hereinafter, the word of 'multi-path' means multi-angle or multi-story.

FIG. 1 shows a block diagram of a HDVD player comprising an optical pickup 12 reading signals recorded in a high-density DVD 11; an analog signal processor 13 binarizing the read signals after compensating levels of the signals; a digital signal processor 14 restoring the binarized signals into digital data and separating the restored data into presentation data containing A/V data and navigation data for reproduction control; an interfacing unit 15 sending the presentation data and PCI (Presentation Control Information) data according to the navigation data to a digital television 200 connected through IEEE 1394 standard; a controller 16 controlling the above elements according to the navigation data and/or user's commands; and a memory 17 storing data which are necessary for the control operation and are generated in data reproduction.

The interfacing unit 15 transmits the presentation data to the digital television 200 through isochronous channel of IEEE 1394, and PCI data according to the navigation data and command data generated on user's request through asynchronous channel of IEEE 1394.

During the reproduction of the high-density DVD 11 in the HDVD player 100, as shown in FIG. 2, a multi-path stream section, for example, section B, which is composed of n section segments B-1, B-2, . . . and B-n, is encountered after an uni-path stream section A is reproduced and transmitted. When a multi-path stream section is encountered, the HDVD player 100 pauses reproduction until a path is selected by a user. If a path of multi-path stream section B, for example, the 2nd section segment B-2 is selected, the controller 16 reproduces and transmits only segment B-2 among all section segments. After transmission of the segment B-2, the controller 16 reproduces stream section C and next sections sequentially until next multi-path stream is encountered. Between a multi-path stream section and its preceding or following stream section, the digital signal processor 14 is controlled so that stream sections transmitted in succession through the isochronous channel are presented seamlessly.

The digital television 200 presents the stream sections, whose receiving sequence is . . . A, B-2, C, . . . , received through the isochronous channel into high-quality pictures on its screen.

However, to transmit stream sections including multi-path stream sections to be presented seamlessly, a high-precision control operation and a complicated algorithm are inevitable. Furthermore, in the situation that several digital televisions are connected with a single HDVD player, each viewer of each digital television can not watch program associated with his or her desired angle or story since only one stream section segment is provided among all segments recorded for a multi-path stream section.

SUMMARY OF THE INVENTION

It is an object of the present invention to provide a data stream transmitting method which copies an uni-path data stream as much as the number of multiple paths of a multi-path stream recorded in a high-density optical disk, and transmits them to an outer device through a digital interface after forming them into respective virtual channel data stream.

The data stream transmitting method according to the present invention, checks the number of maximum multiple paths of data streams recorded in a recording medium when a reproduction of the recording medium is requested, copies an uni-path stream section read from the recording medium so that the number of total same stream sections is equal to a target number larger than two which is determined based on the maximum number, assigns each stream section to a virtual channel to form multi-channel streams, and transmits the multi-channel streams to an outer device through a digital interface.

BRIEF DESCRIPTION OF THE DRAWINGS

The accompanying drawings, which are included to provide a further understanding of the invention, illustrate the preferred embodiments of the invention, and together with the description, serve to explain the principles of the present invention.

In the drawings.

DETAILED DESCRIPTION OF THE PREFFERRED EMBODIMENT

In order that the invention may be fully understood, a preferred embodiment thereof will now be described with reference to the accompanying drawings.

Figure 1:
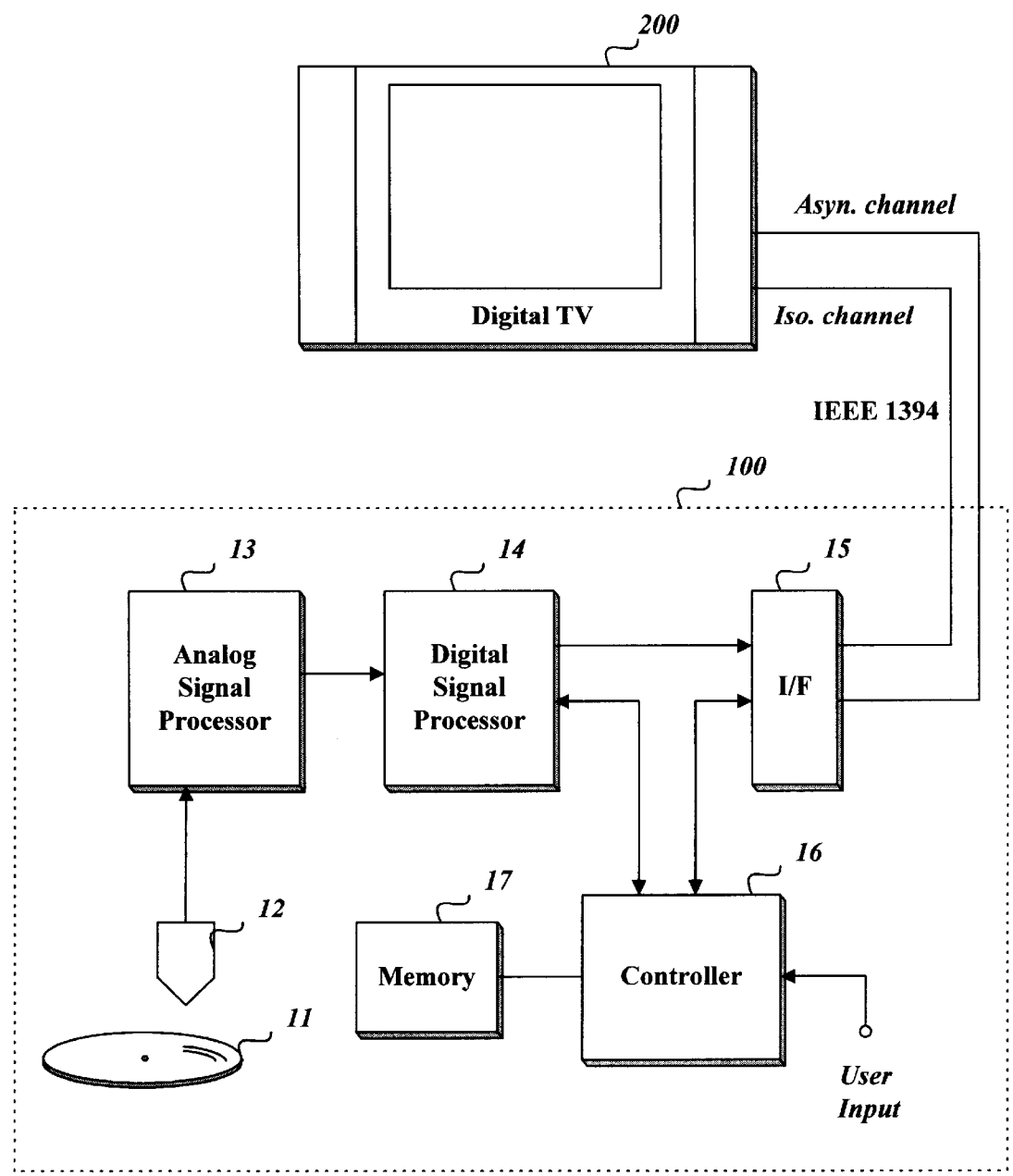
FIG. 1 is a block diagram of a general disk player.
Figure 2:
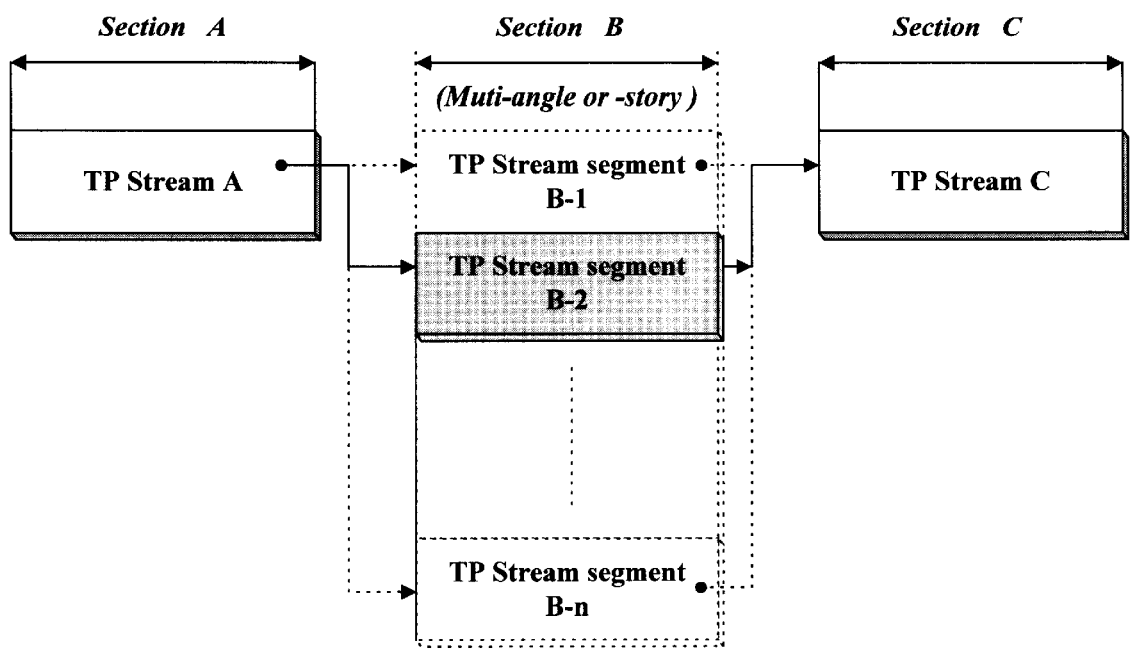
FIG. 2 is an example depicting series of data streams including multi-path stream section transmitted by a general disk player.
Figure 3:
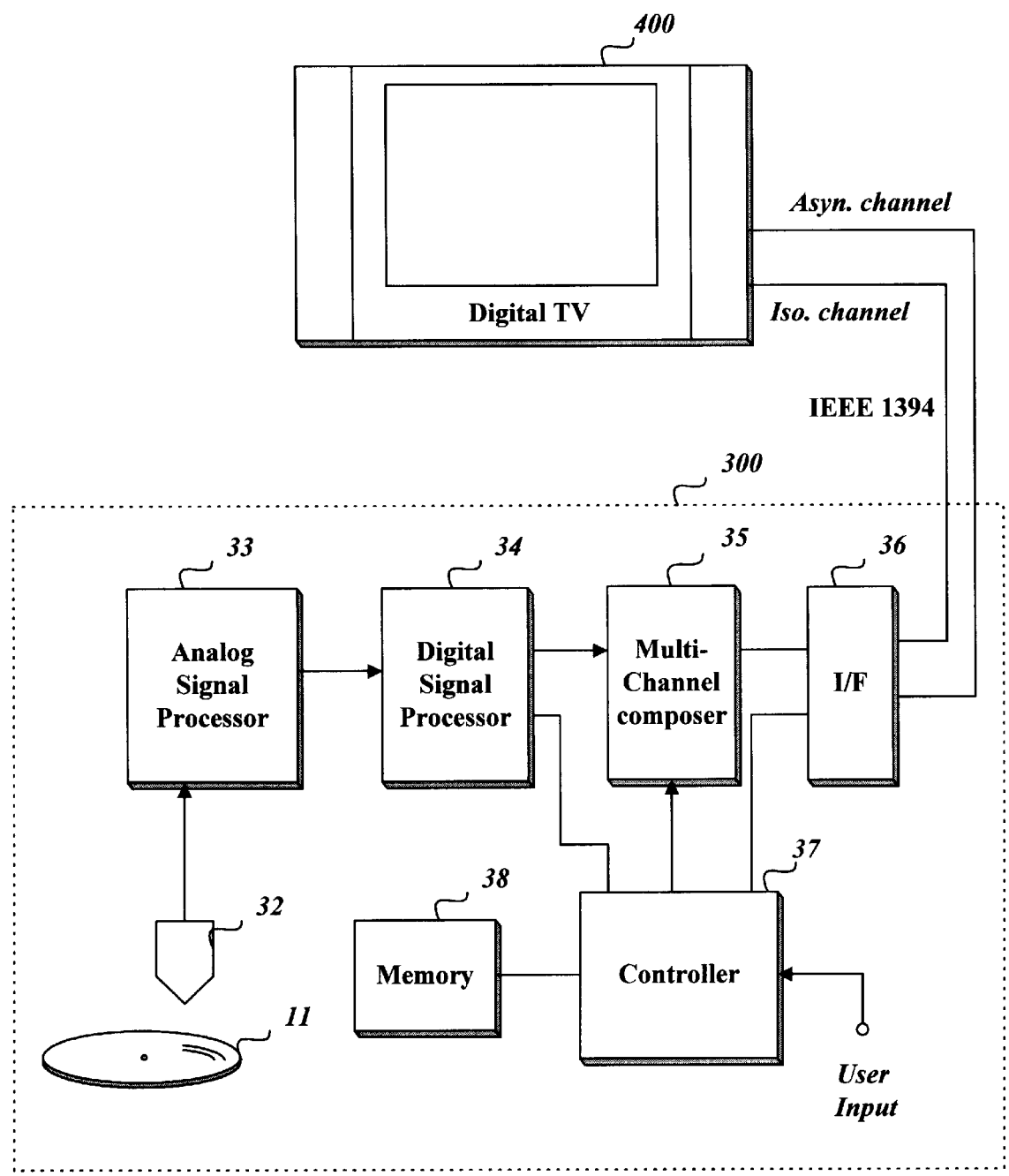
FIG. 3 is a block diagram of a high-density disk player conducting a data stream transmitting method according to the present invention.

FIG. 3 is a block diagram of a HDVD player being able to conduct a data stream transmitting method according to the present invention.

The HDVD player 300 of FIG. 3 comprises an optical pickup 32 reading signals recorded in a high-density DVD 11; an analog signal processor 33 binarizing the read signals after compensating levels of the signals; a digital signal processor 34 restoring the binarized signals into digital data and separating the restored data into presentation data containing A/V data and navigation data for reproduction control; a multi-channel composer 35 multi-channelizing each stream section of presentation data; an interfacing unit 36 sending the multi-channelized streams of presentation data and PCI (Presentation Control Information) data according to the navigation data to the digital television 200 connected through IEEE 1394 standard; a controller 37 controlling the above elements according to the navigation data and/or user's commands; and a memory 38 storing data which are necessary for the control operation and are generated in data reproduction.

Figure 4:
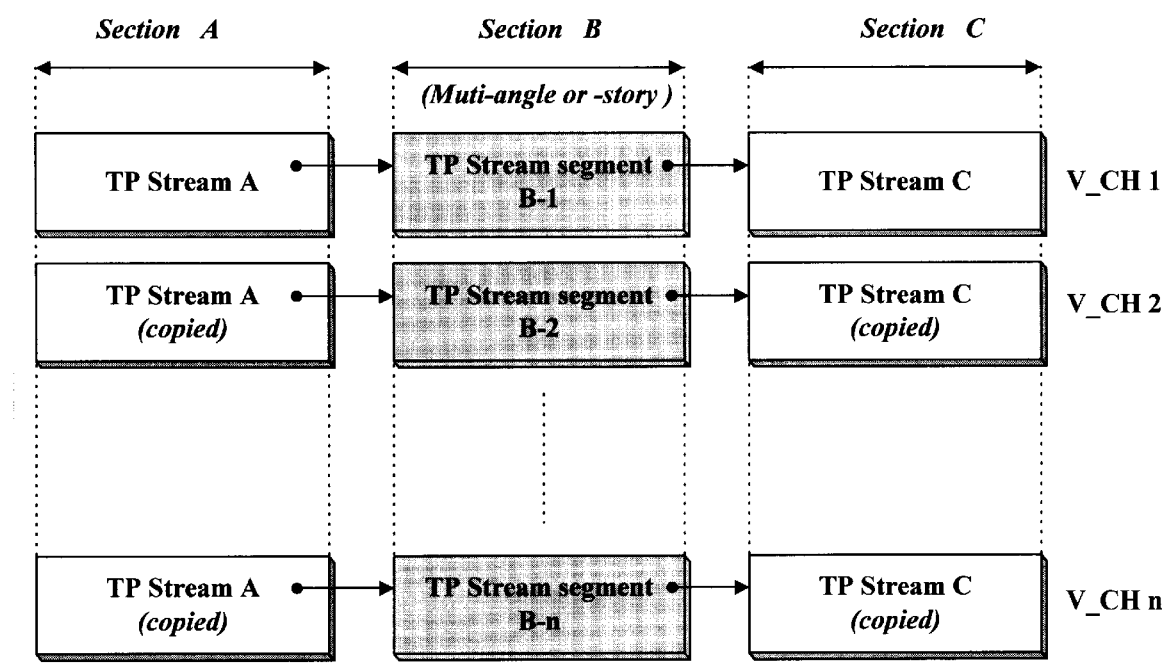
FIG. 4 is an example depicting series of data streams including multi-path stream section transmitted according to the present invention.

FIG. 4 shows an example of stream sections transmitted from the HDVD player 300. To transmit stream sections as shown in FIG. 4, the multi-channel composer 35 makes (n-1) copies of an uni-path stream section A (or C) to form same n stream sections for each uni-path one. The target number n is determined to maximum number of possible paths of all multi-path stream sections like stream section B in FIG. 4. Total n stream sections including all copied sections for an uni-path stream section or total n stream section segments for a multi-path stream section are formed into individual virtual channel data streams in the multi-channel composer 35. If the number of multiple paths of next multi-path stream section is smaller than n, one of section segments of the multi-path stream section is copied necessary times to form n virtual channels.

Figure 5:
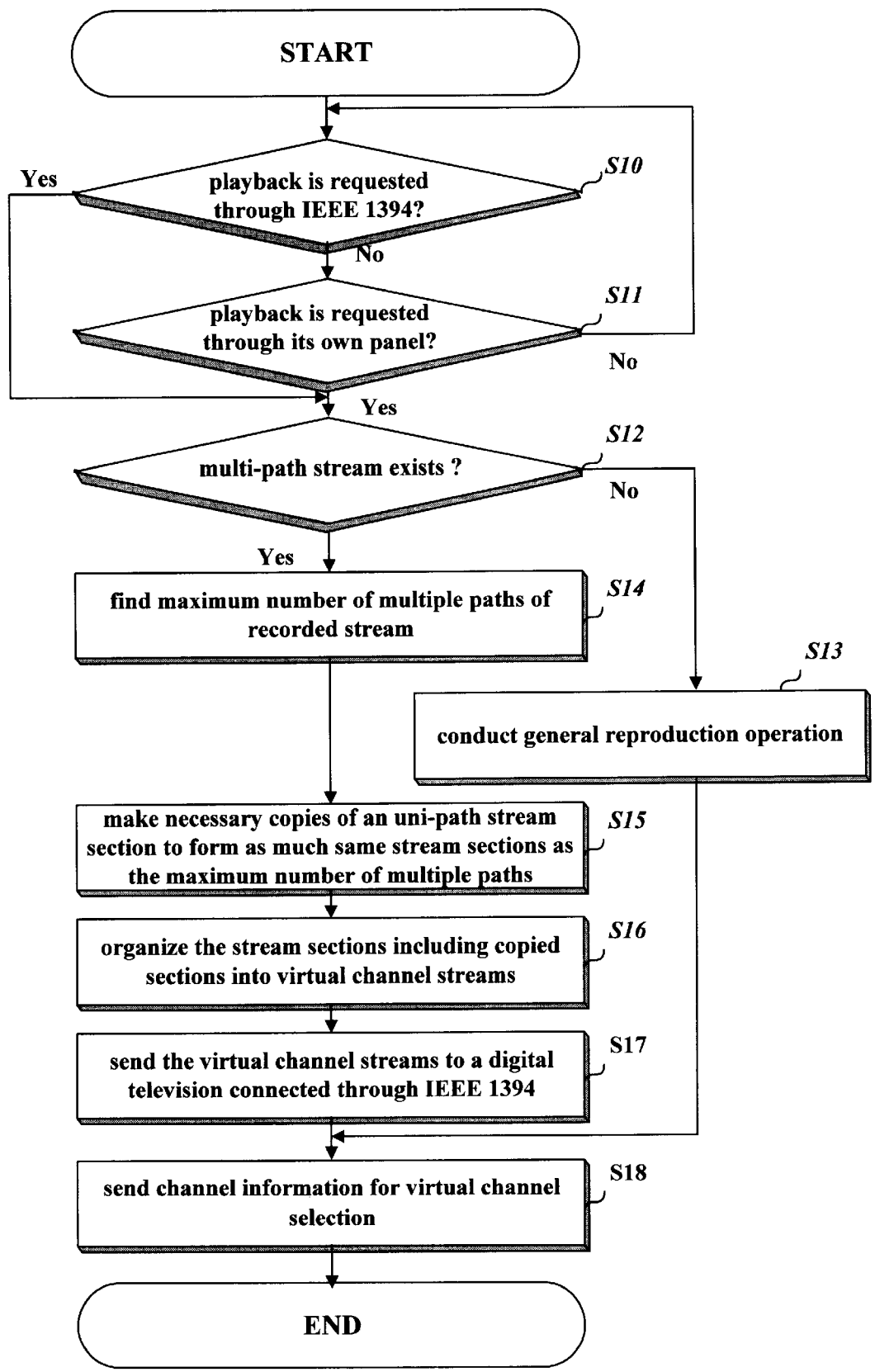
FIG. 5 is a flow diagram embodying a data stream transmitting method according to the present invention.

FIG. 5 is a flow diagram embodying a data stream transmitting method according to the present invention. The procedures depicted in FIG. 5 is explained in detail.

The HDVD player 300 is requested to play back the inserted high-density DVD 11 indirectly from the digital television 400 through IEEE 1394 digital interface (S10) or directly from user's key command through its own control panel (S11).

Then, the controller 37 checks whether there is a multi-path stream section in the recorded data streams (S12) before conducting real reproduction. If there is at least one multi-path stream section, the controller 37 tries to find how many paths a multi-path stream section has (S14). To do this, the controller 37 examines 'Number of Multi-Angle' or 'Number of Multi-Story' field written in navigation data being provided from the digital signal processor 34 during the above checking operation. After that, the controller 37 sets the multi-channel composer 35 to conduct copying operation for an uni-path stream section according to the value of 'Number of Multi-Angle' or 'Number of Multi-Story' field.

If there is not any multi-path stream section, the controller 37 sets the multi-channel composer 35 not to copy an uni-path stream section. Therefore, general reproduction operation, in which only reproduced data streams are transmitted sequentially to the digital television 400 through the IEEE 1394 interface, is conducted (S13).

After the setting of copy operation, the multi-channel composer 35 makes (n-1) copies of each uni-path stream section outputted from the digital signal processor 34 (S15), and outputs n same stream sections to the interfacing unit 36 until the multi-path stream section B is encountered. If multi-path stream section B starts to be reproduced, the multi-channel composer 35 does not copy the section B. instead, separates the stream section B into individual section segments B-1, B-2, . . . , and B-n of each path and sends all segments after assigning them to respective virtual channels. After processing the multi-path stream section B, the multi-channel composer 35 copies again an uni-path stream section C and following stream sections, if they are not for multi-path. Each series of copied stream sections and one or more section segments are also organized into a single virtual channel (S16) by the multi-channel composer 35. Therefore, data streams of n virtual channels V_CH 1, 2, . . . , and n are provided at the same time for the digital television 400 (S17).

In the meantime, the controller 37 generates multi-channel information, which is for virtual channel selection at the digital television 400, and sends it to the digital television 400 through the interfacing unit 36 (S18). The multi-channel information may be a channel selection command according to the user's selection at the HDVD player 300 or all virtual channel guiding information helping a user to choose a channel associated with a path among all different paths.

According to the above copy and transmission operation, the digital television 400 receives data streams successively for every path. Therefore, a viewer watching the digital television 400 can select a virtual channel to view a desired angle- or story-based pictures at any time. Because data streams belonging to all selectable paths are provided in succession, it is very simple to transmit data streams to be presented seamlessly.

The virtual channel corresponding to a path can be selected at the HDVD player 300. In this case, information on a selected channel is transmitted to the digital television 400 as an aforementioned channel selection command.

In general, a digital television can accept and process three or four SD (Super Density) data stream through a physical link whose capacity is 19.4 Mbps/6 MHz. Therefore, it is possible to apply three or four SD data streams to a digital television through a single physical link at the same time with channelizing data distinguishing each stream.

Due to this restriction factor, the acceptable number of virtual channels is considered when it is determined by the controller 37 how many times an uni-path stream section is copied.

That is, if the number of possible paths is equal or smaller than that of the acceptable virtual channels, the controller 37 sets the multi-channel composer 35 to construct as much virtual channels of an uni-path stream section as the number of possible paths. For example, if possible paths are 2 and maximum virtual channels are 4, the controller 37 sets the multi-channel composer 35 to make one copy of an uni-path stream section, which results in two virtual channels including an original stream section.

If the number of possible paths is larger than that of the acceptable channels, the controller 37 sets the multi-channel composer 35 to construct as much virtual channels of an uni-path stream section as acceptable. For example, if multipaths are 5 and maximum channels are 4, the controller 37 sets the multi-channel composer 35 to make three copies of an uni-path stream section, which results in four virtual channels.

However, if more physical link is connected with the digital television, the controller 37 sets the multi-channel composer 35 to make as much, i.e., five in the above example, virtual channels as the number of multiple paths. The remaining virtual channels unacceptable in one physical link are assigned to the other physical link.

Figure 6:
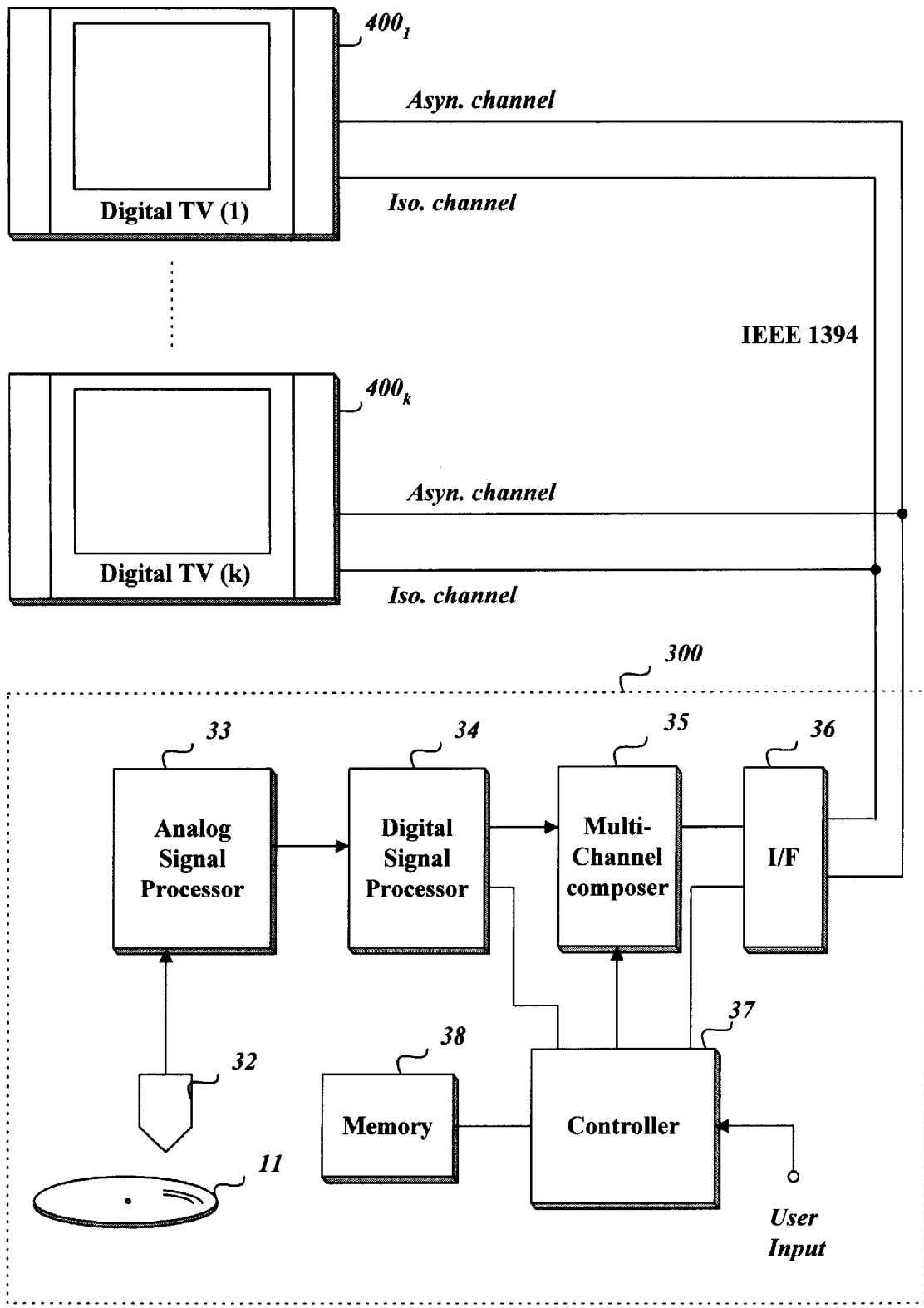
FIG. 6 shows a plurality of digital televisions connected with a single high-density disk player to which a data stream transmitting method according to the present invention is also applicable.

A single HDVD player 300 can be connected with a plurality of digital televisions 400, to $400_k$ through a single IEEE 1394 interface as shown in FIG. 6. In this multiple-connected situation, multiple virtual channels and each channel information are provided for all digital televisions, so that a viewer watching one of the digital televisions can view any angle- or story-based program he or she wants to by choosing a corresponding virtual channel based on the received channel information.

The data stream transmitting method according to the present invention enables simple algorithm to transmit an angle- or story-based stream a viewer wants to view among multi-path stream so that the selected angle or story stream segment may be presented seamlessly at the borders between neighboring stream sections. In addition, if this present method is applied to an situation that a HDVD player is connected with multiple digital televisions, each of viewers can view any angle- or story-based program he or she wants to among all provided multi-path streams without being interrupted by other viewers.

The invention may be embodied in other specific forms without departing from the sprit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A method of transmitting data streams recorded in a recording medium when a reproduction of the recording medium is requested, comprising the steps of:
   (a) checking the number of multiple paths of data streams recorded in the recording medium;
   (b) copying an uni-path stream section read from the recording medium so that the number of total same stream sections is equal to a target number which is determined based on the checked multiple paths, and assigning each stream section to a virtual channel to form multi-channel streams; and
   (c) transmitting the multi-channel streams to an outer device through a digital interface.

2. The method set forth in claim 1, wherein said step (c) further transmits channel information for selecting one virtual channel among the multi-channels.

3. The method set forth in claim 2, wherein said step (c) transmits the multi-channel streams through isochronous channel of the digital interface, and the channel information through asynchronous channel of the digital interface.

4. The method set forth in claim 2, wherein said channel information is to command the outer device receiving the multi-channel streams to select one virtual channel among the multi-channels.

5. The method set forth in claim 1, wherein data stream of multiple paths consists of two or more stream segments, each segment having moving pictures viewed at different angle or developing different story, and having same start reproduction time with other segments.

6. The method set forth in claim 1, wherein said step (b) converts a multi-path stream section composed of multiple segments into multiple channels by assigning each segment to each channel wherein each segment is corresponding to each path.

7. The method set forth in claim 6, wherein said step (b) copies one of stream segments belonging to a multi-path stream section so that sum of the number of total segments and the number of copied segments is equal to the number of the checked multiple paths, if the number of the stream segments is smaller than the target number.

8. The method set forth in claim 1, wherein said step (b) determines the target number based on whether or not the number of virtual channels acceptable in a physical link connected to the outer device is larger than that of the checked multiple paths.

9. The method set forth in claim 8, wherein the target number is determined to the number of the acceptable virtual channels, if the number of the checked multiple paths is larger than that of the acceptable channels.

10. The method set forth in claim 8, wherein the target number is determined to the number of the checked multiple paths, if the number of the multiple paths is equal or smaller than that of the acceptable virtual channels.

11. The method set forth in claim 1, wherein said step (c) transmits all of data stream having multiple paths to a plurality of digital televisions connected through a digital interface at the same time.

12. The method set forth in claim 1, wherein the target number is determined to the number of maximum paths among the checked multiple paths.

* * * * *